United States Patent Office 3,681,214
Patented Aug. 1, 1972

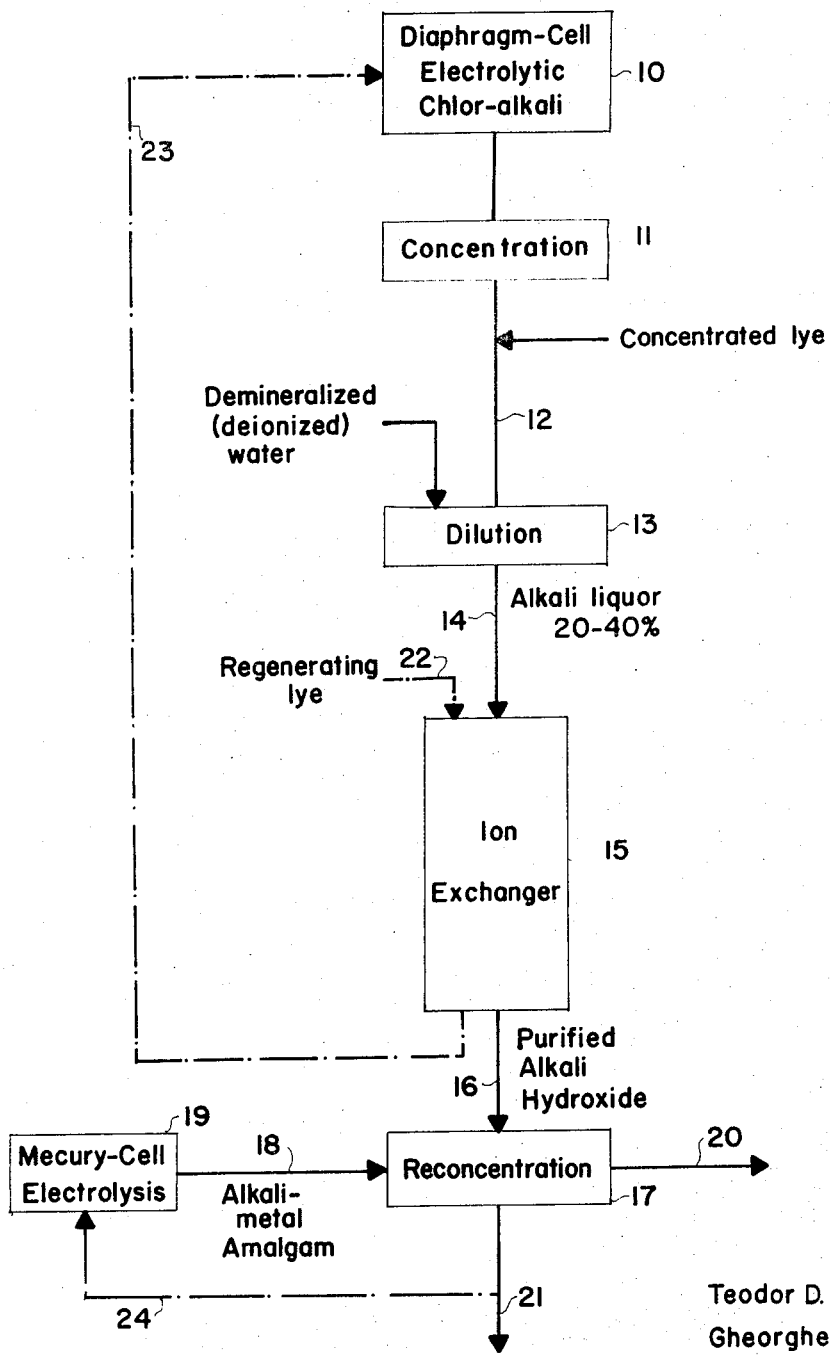

3,681,214
PROCESS FOR PRODUCING HIGH-PURITY
ALKALI HYDROXIDES
Teodor D. Ionescu, Bucharest, and Gheorghe F. Uta and
Aurel D. Teodoru, Gheorghe Gheorghiu Dej, Rumania,
assignors to Grupul Industrial de Petrochimie, Judetul-
Bacau, Rumania
Filed Jan. 11, 1971, Ser. No. 105,311
Int. Cl. C01b 13/14; C01d 1/28
U.S. Cl. 204—96  9 Claims

ABSTRACT OF THE DISCLOSURE

A process for producing high-purity alkali hydroxides, e.g. sodium hydroxide or potassium hydroxide in which an impure fluid is drawn from a diaphragm-cell electrolysis plant and a concentration above 40% generally 50% or higher, is diluted with deionized water to a concentration of 20% to 40% alkali hydroxide, the resulting solution being subjected to ion exchange with a highly basic anion-exchange resin whereupon the decontaminated solution is treated with an amalgam of the same alkali metal. The amalgam is preferably drawn from a mercury-cell electrolysis process.

(1) FIELD OF THE INVENTION

Our present invention relates to a process for producing high-purity alkali hydroxides and, more particularly, to a process for transforming chemically contaminated caustic solutions into chemically pure solutions of alkali hydroxides, especially sodium hydroxides and potassium hydroxides.

(2) BACKGROUND OF THE INVENTION

Diaphragm cells for the production of chlorine in the "diaphragm chlor-alkali" process is in common use at the present time. In the operation of a typical diaphragm cell, sodium or potassium chloride brine, nearly saturated at a temperature of approximately 60 to 70%, is fed into an anolyte compartment, from which it passes through the diaphragm into the catholyte compartment where alkali is formed. As a result of the electrolysis, chlorine gas is formed at the anode and hydrogen and alkali are formed at the cathode. Flow is continuous with a differential head maintaining continuity of the passage of the electrolyte through the diaphragm. Only a portion of the alkali-metal chloride entering the cell is electrolyzed and the unreacted portion leaves with the hydroxide solution from the catholyte compartment. Hence one of the products of diaphragm-cell electrolysis is an alkali-metal hydroxide.

To obtain high-purity alkali hydroxides from alkali lyes resulting from diaphragm electrolysis, particularly where the electrolysis cell produces sodium hydroxide, various processes have been developed. Perhaps the most efficient of these processes involves the use of ion exchange.

The alkali lyes derived from the diaphragm-cell electrolysis stage have alkali concentrations of 25% to 36% and retain large concentrations of impurities including the chloride (sodium chloride or potassium chloride), the sulfate (sodium sulfate or potassium sulfate) and the chlorate (sodium chlorate or potassium chlorate). The use of ion-exchange resins or ionites with such concentrations of alkali lyes is unsatisfactory because of the high impurity content. It is possible to derive alkali liquors having a concentration of about 50% but below 55% of the alkali-metal hydroxide and which contain lower concentrations of these undesirable components by virtue of a preliminary precipitation of the impurity salts. With such highly concentrated liquors, however, ion-exchange purification may be carried out only with limited success because the retention of the impurities is not quantitative. In other words, low-concentration high-impurity liquors as derived from the diaphragm-cell electrolysis process cannot be satisfactorily subjected to ion-exchange purification because the ion-exchange capacity of the resin is rapidly depleted and the process is uneconomical while high concentration low-impurity liquors as drawn from the diaphragm-cell electrolysis plant cannot be satisfactorily subjected to ion-exchange purification because the ion-exchange resin does not retain a sufficient proportion of the impurity anions to yield a technically pure product.

Moreover, since the ion-exchange process is exothermic, the temperature rises during regeneration of the resin and purification, thereby reducing the ion-exchange capacity of the resin. In fact, the best resins for purification of the aforementioned liquors are strongly basic anion-exchange resins and these have been found to lose capacity in the presence of concentrated alkali liquors. The term "concentrated" is here used to identify alkali liquors with a concentration of the alkali-metal hydroxide in excess of 45% and generally greater than 50%, but below 55%. As a result, the ion-exchange capacity is rapidly consumed and the amount of purified liquor which can be obtained per unit weight or volume of the resin is low and frequent recycling with consequent economical loss is necessary.

(3) OBJECTS OF THE INVENTION

It is the principal object of the present invention to provide an improved method of or process for producing high-purity alkali solutions (i.e. solutions of alkali-metal hydroxides such as sodium hydroxide and potassium hydroxide), wherein the aforementioned disadvantages are avoided.

It is another object of the invention to provide an improved process for recovering high-purity alkali-metal hydroxides from the alkali effluent of a diaphragm-cell electrolysis plant at low cost, with a minimum of regeneration cycles of the ion-discharge resin and without the other drawbacks enumerated above.

(4) SUMMARY OF THE INVENTION

We have found, most surprisingly, that the foregoing objects can be attained and the disadvantages set forth earlier obviated by a process for producing high-purity alkali-metal hydroxide from the concentrated alkali-metal hydroxide liquors of a diaphragm-cell electrolysis plant for the production of chlorine, the liquor containing sodium hydroxide together with impurities such as sodium chloride, sodium sulfate and sodium chlorate, or potassium hydroxide together with impurities such as potassium chloride, potassium sulfate and potassium chlorate, when the concentrated lye (at least 50% alkali-metal hydroxide by weight and resulting from concentration of the diaphragm cell effluent in accordance with conventional practices) is diluted with deionized or demineralized water, the dilute solution having a concentration of 20 to 40% of the alkali-metal hydroxide. After such dilution, the dilute liquor is subjected to ion-exchange treatment with a strongly basic anionic exchange resin to produce a purified eluate which is then concentrated (reconcentrated) by reaction with an amalgam of the corresponding alkali metal. Advantageously, the amalgam is derived from a mercury-cell electrolysis process. The mercury which precipitates is easily separated by decantation of the reconcentrated liquor which is found to be substantially free from impurities. Of course, any other source of the amalgam may be used.

Best results are obtained with the strongly basic anion exchange resins having a polystyrene matrix and of the trimethylbenzylammonium type (DOWEX–1) or ammonium type (DOWEX–2). The former resin may be 8% crosslinked, have a bulk wet density of 0.72

(grams per cm.³), a moisture content when drained of 56% by weight, an operating temperature between 25 and 40° C. and a dry-exchange capacity of 4.1 milliequivalents per gram and a wet-exchange capacity of 1.3 milliequivalents per gram. The resin is used in the form of spherical particles. The second type of resin is 8% crosslinked, has a bulk weight or density (drained) of 0.74 g./cm.³, a drained moisture content by weight of 42%, a corresponding operating temperature, a dry-exchange capacity of 3.4 milliequivalents per gram and a wet-exchange capacity of 1.4 milliequivalents per gram. The resins may be regenerated by the use of dilute alkali-metal solutions in accordance with conventional teachings.

(5) DESCRIPTION OF THE DRAWING

The above and other objects, features and advantages of the present invention will become more readily apparent from the following description, reference being made to the accompanying drawing in which the sole figure of which is a flow diagram illustrating the principles of the invention.

(6) SPECIFIC DESCRIPTION

In the drawing we show a diaphragm-cell electrolysis chlor-alkali plant 10 having a concentrating stage 11 in which the alkali effluent is evaporated to a concentration 50% or more in the alkali-metal hydroxide. According to the principles of the present invention, the concentrated impure alkali derived from the concentration stage at 12 is introduced into a dilution stage 13 to which deionized water is added.

The resulting liquor is drawn at 14 from the dilution stage and consists of an alkali liquor with a concentration of 20 to 40% in the alkali-metal hydroxide. The dilute solution is passed into an ion-exchange column 15 from which a purified solution emerges at 16. This solution is introduced into the reconcentration vessel 17 to which the alkali-metal amalgam is suppiled as shown at 18 from a mercury-cell electrolysis plant 19.

The concentrated alkali hydroxide is recovered at 20 while the mercury is separated at 21 and may be returned to the electrolysis plant 19 as represented by line 24. Regeneration of the ion-exchange resin is carried out by regenerating lye supplied at 22 with the impure solution being recovered at 23 and returned if desired to the diaphragm electrolysis plant.

When reference is made hereinafter to a strongly basic ion-exchange resin, it is understood that it is intended to identify both of the resins (DOWEX-1 and DOWEX-2) mentioned earlier. Each examples was carried out with both types of resin and equivalent results were obtained. Furthermore, reference to a potassium hydroxide lye or a sodium hydroxide lye in the example is intended to describe the liquors obtained from a diaphragm-cell electrolysis plant as described in pages 174-183 of The Encyclopedia of Electrochemistry, Rheinhold Publishing Corp., New York, 1964. Reference to mercury-cell electrolysis and to alkali-metal amalgam derived therefrom is intended to describe the process and plant disclosed at pages 184 ff. of The Encyclopedia of Electrochemistry.

(7) SPECIFIC EXAMPLES (I) A potassium hydroxide lye containing 230 g. KOH/l., 5.43 g. KCl/l. and 0.548 g. KClO₃/l., obtained by diluting with deionized water a concentrated potassium hydroxide lye, derived from the diaphragm-cell electrolysis plant, is passed through a glass column having a 2.2 cm. diameter, filled with 160 ml. wet strongly basic anionic resin (DOWEX-1 and DOWEX-2), previously regenerated with a 5% KOH solution. At the bottom of the column, 1000 ml. of effluent are collected, which contain only 0.005 g. KCl/l. and 0.0084 g. KClO₃/l. The resulting effluent is concentrated with the aid of potassium amalgam derived from a mercury-cell electrolysis, obtaining thus a high purity lye of a 50% KOH concentration.

(II) A sodium hydroxide lye containing 212 g. NaOH/l., 4.64 g. NaCl/l. and 0.43 g. NaClO₃/l., obtained by diluting with deionized water a raw sodium hydrate lye containing 50% NaOH, resulting from the evaporation plant for diaphragm electrolysis lyes, is passed through a glass column having a 2.2 cm. diameter, filled with 50 g. of a strongly basic anionic resin (DOWEX-1, DOWEX-2), previously regenerated with a 4% NaOH solution. At the bottom of the column an effluent is collected, free of sodium chloride and sodium chlorate. The resulting effluent is concentrated with the aid of sodium amalgam from the mercury-cathode electrolysis. A lye is obtained having a 50% NaOH concentration and only 0.0008% NaCl content.

(III) A sodium hydrate lye containing 408 g. NaOH/l., 7.44 g. NaCl/l. and 0.99 g. NaClO₃/l. also obtained by diluting with deionized water a raw 50% NaOH lye, is passed through the column described in Example II, after regenerating the anionite with a 4% NaOH solution. At the bottom of the column an effluent is collected, practically free of chloride and chlorate. The effluent is concentrated with the aid of the sodium amalgam, and a concentrated sodium hydroxide solution is obtained, containing only 0.001% NaCl.

From the foregoing examples it is clear that by introducing into the ionite column alkali solutions, the concentrations of which do not cause substantial differences with regard to both the hydration of the components

$NaOH-NaCl-Na_2SO_4-NaClO_3$ and respectively $KOH-KCl-K_2SO_4-KClO_3$ of the alkali lye passing through the column, and the hydration of the ionite phase, the drawbacks of the known processes for purifying concentrated alkali lyes with the aid of ionites may be avoided.

To obtain an optimum degree of hydration of the components of the alkali lye, corresponding to an efficient contact with the swollen ionite phase, the raw lyes coming from the diaphragm electrolysis, previously concentrated by evaporation to a 50% alkali hydroxide content, in order to obtain a preliminary precipitation of the salts, are diluted to a 20 to 40% hydroxide content. Passed through the ionite column, the so diluted lyes are quantitatively purified, obtaining high purity alkali hydroxide effluents, practically chemically clean.

To concentrate the diluted lyes, purified as above described by ion exchange, the alkali metal amalgam is utilized according to the present invention. Thus a cooperation between the mercury-cathode electrolysis process and the diaphragm electrolysis process is achieved, which leads to the production of concentrated alkali hydroxide lyes of high purity, under higher technical economical conditions.

The lyes resulting from the regeneration of the ionites may be utilized to dilute raw 50% alkali hydroxide lyes in order to obtain solutions of lower concentrations, of use in various processes in chlorine plants. The lyes from regeneration, which have a lower content of impurities, may also be concentrated.

The application of the process according to the invention offers the following advantages: the quantitative purification of the electrolytic lyes introduced into the process, obtaining finally concentrated lyes of a purity equal to that of lyes resulting from modern mercury-cathode electrolysis plants; the increase of the useful life of the ionites, of about 7 times in comparison with the processes utilizing influent streams of a 50% alkali hydroxide concentration; the increase of the effective exchange capacity of the ionite beds; and the substantial reduction of the mercury stock and consumption per ton of high purity alkali hydroxide produced.

We claim:

1. A process for producing a high-purity alkali-metal hydroxide comprising the steps of deriving a concentrated liquor containing the alkali-metal hydroxide together with anionic impurities from a diaphragm-cell electrolysis installation; diluting said liquor with demineralized water to a concentration of the alkali-metal hydroxide below about 40% to produce a dilute impure solution; subjecting the dilute impure solution to ion exchange with a highly basic anionic-exchange resin to substantially remove ionic impurities from said solution and produce a relatively pure dilute solution of the alkali-metal hydroxide; and reconcentrating the alkali-metal hydroxide by reacting said relatively pure solution with an amalgam of the corresponding alkali metal.

2. The process defined in claim 1 wherein the alkali-metal hydroxide is sodium hydroxide.

3. The process defined in claim 2 wherein the alkali-metal hydroxide is potassium hydroxide.

4. The process defined in claim 1 wherein said amalgam is derived from a mercury-cell electrolysis process.

5. The process defined in claim 1 wherein said liquor is diluted with sufficient demineralized water to yield an impure solution having an alkali-metal concentration of 20 to 40%.

6. The process defined in claim 4 wherein said liquor is diluted with sufficient demineralized water to yield impure solution having an alkali-metal concentration of 20 to 40%.

7. The process defined in claim 6 wherein the resin is of the polystyrene matrix type.

8. The process defined in claim 7 wherein said liquor has a sodium hydroxide or potassium hydroxide concentration of at least 50%, said method further comprising the step of regenerating the resin with a potassium hydroxide or sodium hydroxide solution.

9. The process defined in claim 8, further comprising the step of concentrating the solution used to regenerate said resin.

References Cited

UNITED STATES PATENTS

| | | | |
|---|---|---|---|
| 3,213,006 | 10/1965 | Crain et al. | 204—99 |
| 3,321,388 | 5/1967 | Ueda et al. | 204—98 |
| 3,535,215 | 10/1970 | Grotheer | 204—99 X |
| 3,536,597 | 10/1970 | Yamori et al. | 204—99 |

JOHN H. MACK, Primary Examiner.

D. R. VALENTINE, Assistant Examiner

U.S. Cl. X.R.

204—98, 99